Oct. 31, 1939. J. S. JOHNSON 2,178,477
FUEL CONTROL DEVICE OR THE LIKE
Filed Nov. 9, 1937 2 Sheets-Sheet 1
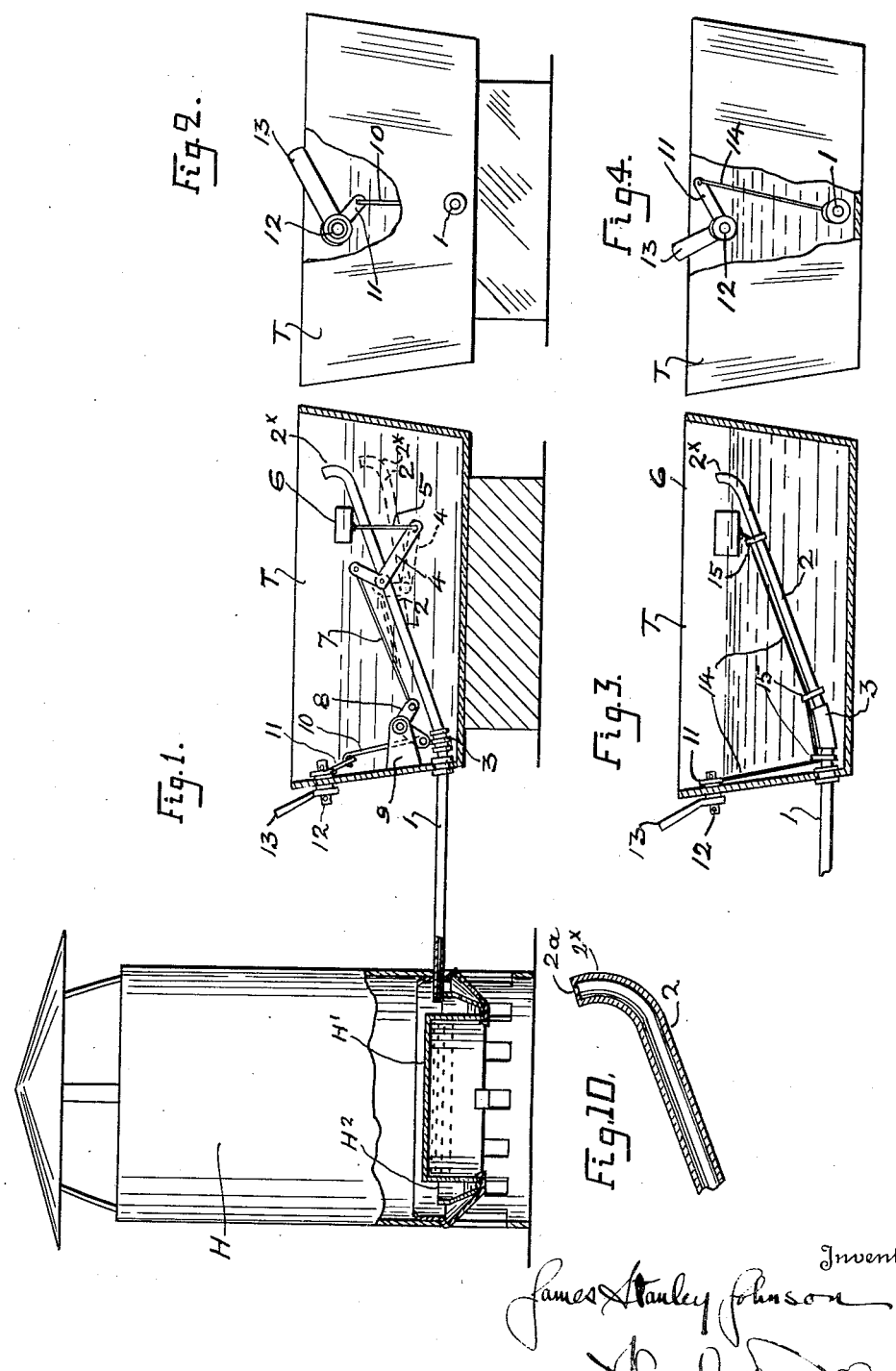

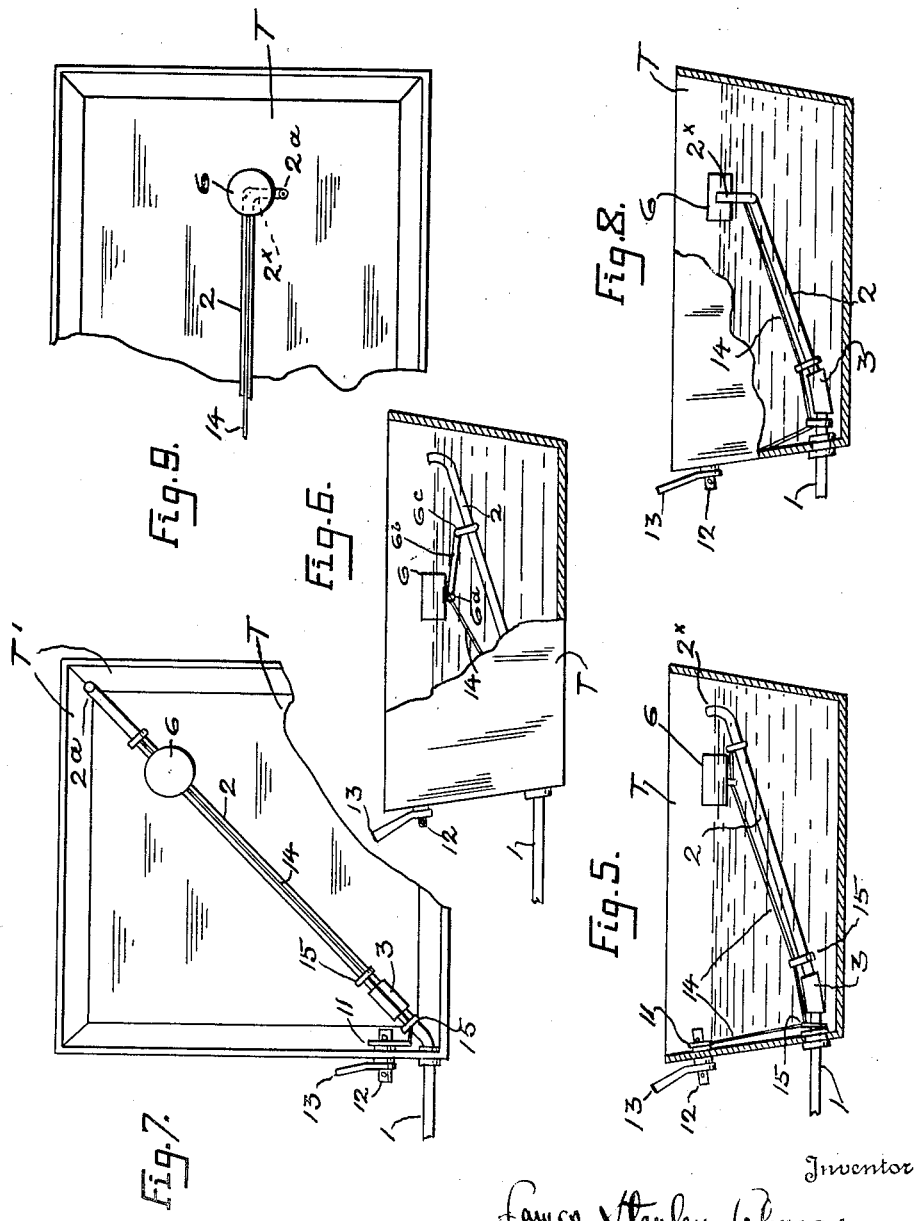

Patented Oct. 31, 1939

2,178,477

UNITED STATES PATENT OFFICE 2,178,477

FUEL CONTROL DEVICE OR THE LIKE

James Stanley Johnson, Pasadena, Calif.

Application November 9, 1937, Serial No. 173,716

4 Claims. (Cl. 137—21)

This invention relates to fuel control devices for orchard heaters and the like, and the principal object of the invention is to provide a novel fuel control device particularly adapted for use in regulating the amount of fuel supplied to heaters of the "drip" type commonly used in heating air and fruit in orange groves or the like, which type of heaters are provided with burners supplied with a small but continuous flow of oil or liquid fuel without appreciable pressure. As the fuel is quickly consumed in the burners the burning rate may be readily regulated by merely controlling the flow of fuel. One form of such "drip" type heater is disclosed in U. S. Letters Patent No. 1,512,270, dated October 21, 1924.

The usual method of controlling the flow of fuel supplied to such heaters is to allow same to flow through a horizontal rotatable tube passing through a stuffing box in the side of the fuel tank and conducting the fuel from the orifice to the burner, said tube being operated by a lever disposed exteriorly of the tank, and having a lateral extension within the tank provided at its end with an orifice of small size with respect to the diameter of the tube so that the tube is never full and there is never any appreciable suction below the orifice. Rotation of the tube will adjust the height of the orifice with respect to the bottom of the container. Under this method however the flow of fuel is proportioned to the head of fuel above the orifice, which head is regulated by adjusting the position of the lateral extension.

One marked disadvantage under the above feed control method is, that as the fuel level drops in the fuel tank the head necessarily changes and the rate of fuel flow through the orifice decreases, and therefore it is necessary to re-set the position of the orifice at short time intervals, usually each hour or two. Another disadvantage is, that inasmuch as the amount of fuel generally differs materially between the different fuel tanks of the heaters in a grove, the tubes or adjusting levers attached thereto cannot all be set in the same relative position to give the same burning rate in all the heaters, and therefore in order to properly set each heater to desired burning rate it is necessary to first determine the level of the fuel in the tank which necessitates removal of the tank cover, an operation particularly troublesome when the heaters are first being lighted, and when considerable haste is essential in starting all the heaters burning through the entire grove or orchard.

My novel fuel control devices provide an ideal arrangement in that each position of the regulating lever of the tube determines a definite and constant flow of fuel regardless of the level of the fuel in the tank, my invention accomplishing this end by providing means for regulating the position of the orifice with respect to the fuel level in the tank rather than with respect to the bottom of the tank. In my invention the fuel feed tube has an end passing through and mounted rigidly in the wall of the tank adjacent its bottom, and has a flexible or movable section within the tank which is free to rise and fall within the tank, said flexible or movable section being suspended from a float on the surface of the fuel, and the flexible or movable section being provided adjacent its upper end with the orifice, so that by regulating the relative position of the float with respect to the orificed end of the flexible or movable section which is suspended from the float, the desired purpose can be accomplished in that a constant head of fuel will be maintained above the orifice regardless of the level of fuel in the tank.

Other minor objects will be hereinafter set forth.

I will explain the invention with reference to the accompanying drawngs which illustrate several practical embodiments thereof to enable others to adopt and use the same; and will summarize in the claims the novel features of construction, and novel combinations of parts, for which protection is desired.

In said drawings—

Fig. 1 is a vertical sectional view of a conventional orchard heater embodying one form of my novel fuel control device in the fuel tank thereof.

Fig. 2 is an end elevation of the fuel tank shown in Fig. 1, showing the lever for adjusting the orifice with respect to the float.

Fig. 3 is a vertical sectional view of the tank shown in Fig. 1 illustrating a modified form of the fuel control device.

Fig. 4 is an end elevation of the tank shown in Fig. 3 illustrating the lever arrangement.

Fig. 5 is a view similar to Fig. 3 showing a further modified fuel control device in the fuel tank.

Fig. 6 is a partial vertical section showing a further modified fuel control device.

Fig. 7 is a top plan view of a still further modified form of tank and fuel control device.

Fig. 8 is a view similar to Fig. 3 showing a further modified form of fuel control device.

Fig. 9 is a top plan view of the float and adjacent portion of the tube shown in Fig. 8.

Fig. 10 is an enlarged detail sectional view of the orificed end of the tube.

As shown in Figs. 1 and 2, the orchard heater H is of conventional form, the same having a burner H', and a fuel reservoir H2 therein adjacent its lower end supplied through tube 1 with fuel from a fuel tank T disposed beside the heater, suitable control devices being provided for regulating the flow of fuel from tank T to the burner H'.

Fuel tube 1 passes through a wall of the tank T adjacent its lower end and leads to the reservoir H2 of heater H, and has within the tank a flexible or movable section 2 connected with the end of tube 1 by a flexible connection 3, which may be a length of rubber hose, or may be a section of expanded flexible metal tubing, the sides of which are corrugated in the form of a bellows, or may be a pivotable joint allowing the movable section 2 to rotate on a horizontal axis so that the orifice 2a therein (Fig. 10) may be raised or lowered with respect to the surface of the fuel, the movable section 2 being adapted to rise and fall within tank T, and its outer end being offset or curved upwardly, as at 2x (Fig. 10). Orifice 2a is of relatively smaller diameter than that of tube 2 so that the fuel will feed drop by drop or in a very small or restricted flow into the section, thereby eliminating suction such as would be set up in case the tube were filled with fuel. If desired a screen (not shown) could be placed over the orifice.

Pivoted on the movable section 2 adjacent its free end is a bell crank lever 4, to one arm of which a float 6 is secured by rod or wire 5 connected to its underside, the float supporting the free end of movable section 2 in a position of definite relation with respect to the level of fluid in tank T. Float 6 may be either of buoyant material or may be hollow, and either a single float or a plurality of floats may be used.

Float 6 is adjustably mounted with respect to movable section 2 in order to adjust the elevation of the orifice 2a in order to bring same above, at, or below, the level of the liquid fuel in tank T. In Figs. 1 and 2 the relative position of the float 6 and orifice 2a is adjusted by a system of levers operated by an adjusting handle 13 on the exterior of the tank. In said figures the other leg of bell crank lever 4 is connected by a wire or rod 7 to one leg of a bell crank lever 8 pivoted on a bracket 9 mounted upon a side wall of the tank, the other leg of bell crank lever 8 being connected by a rod or wire 10 to an arm 11 mounted on a bolt 12 extending through the side wall of the tank above the bracket 9, said bolt 12 carrying a lever 13 on the exterior of the tank, whereby as hand lever 13 is rotated the rod 10 will be raised or lowered to adjust the float 6 through the systems of rods 7—5 and bell crank levers 8—4 with respect to the orifice 2a of movable section 2. Lever 13 is show in full lines in such position that the fuel would not enter the orifice 2a. By rotating the handle 13 in a counterclockwise direction the rod 7 will be shifted to pivot the bell crank lever into the position shown in dotted lines and thus lower the section 2 with respect to float 6, so as to adjust the orifice 2a below the surface of the fuel and cause the fuel to start flowing into orifice 2a. Rod 7 is disposed substantially parallel with the axis of section 2 so that movement of the rod will not appreciably affect the position or angularity of the section which will remain in substantially the same relative position when the float is being adjusted.

Lever 13 and arm 11 can be mounted near the top edge of the container, and same do not reduce the container capacity for any practical purposes. It should be understood, however, that packing can be introduced at this point if desired, and that lever 13 and arm 11 need not be mounted at any specific point in the tank.

By placing the handle 13 on the exterior of the tank T it is made possible to provide the tank with the usual cover (not shown) without interference with the system of levers. Motion can be transmitted from lever 13 to arm 11 by any one of several methods, such as by using a square bolt 12 to connect the two. Spring washers on the bolt (not shown) may be provided to afford ample frictional resistance to hold the mechanism at any desired setting.

In Figs. 3 and 4 a modified form of fuel control means is shown, said means adjusting the movable section 2 with respect to float 6, the movable section 2 being connected by a flexible connection 3 as in Fig. 1. In this modification, bolt 12 carries the hand lever 13 and also the arm 11, as in Figs. 1 and 2. A light chain or other flexible medium 14 has one end attached to the float 6, the chain passing through the several eyes 15, and thence to lever arm 11 connected with the adjusting handle 13. Since the chain 14 is disposed for the major part of its length along the section 2 axial movement of the chain will not appreciably disturb the position or angularity of section 2 when the float is being adjusted.

Fig. 5 shows a further modification of the fuel control shown in Fig. 3. One end of the flexible medium 14 is attached to the outer end portion of movable section 2 and then passes through the eyes 15 to the adjusting lever 11, the medium 14 passing through an eye in the bottom of the float 6.

In Fig. 6 a further modification is shown which is somewhat similar to that shown in Fig. 5. In the modification the medium 14 is connected to the underside of the float 6, which latter is connected either rigidly or pivotally as at 6a to a rigid arm 6b whose opposite end is pivoted or flexibly mounted as at 6c to the outer end of section 2, so that as lever 13 is adjusted the member 6b carrying float 6 will merely swing in an arc about the point 6c.

Fig. 7 shows the fuel control assembly mounted diagonally within a rectangular tank T. This arrangement presents the advantage that the corner T' formed between adjacent side walls of the tank prevents the movable section 2 from swinging to any great extent laterally from side to side, and holds the assembly in proper alignment, which feature is valuable especially when using a flexible tube section 3 of material which takes a permanent set when maintained flexed beyond a certain angle.

The position of the orifice 2a with respect to the float 6 does not have to be as shown in Figs. 1–7. The orifice 2a may be disposed in a laterally offset portion 2x at the side of float 6 as shown in Figs. 8–9, or disposed in any other desired position.

In each of the modifications above disclosed the float adjusting means, whether involving the system of levers shown in Figs. 1–2 or involving the chain or other flexible medium shown in Figs. 3–9, comprises mechanism whose functioning depends upon translation of one or more of the members, or parts of one or more members, in a direction substantially parallel to the axis of the movable section 2 of the tube in which the orifice 2a is mounted, or upon such translation combined with rotation in a plane determined by the member 2 and said other member or members.

My novel fuel control is not restricted to use only in connection with heaters such as shown in the drawings, for obviously same may be used in connection with any heater operating on the "drip" principle.

I claim:

1. In a fuel tank, a conduit extending into the lower end thereof, a rigid tube registering with and swingably connected with the conduit within the tank and having a restricted orifice adjacent its free end; a float within the tank for supporting the free end of the tube; a hand lever mounted on the exterior of the tank; an arm on said lever within the tank; and a flexible member connecting the float and arm and having a portion extending through guides along the inner end of the conduit and along the tube, whereby operation of the handle will vertically adjust the float with respect to the free end of the tube while minimizing any tendency of the pull on the flexible member to swing the tube.

2. In a fuel tank as set forth in claim 1, said tank being rectangular in plan, and said tube extending diagonally thereof and terminating adjacent a corner formed between meeting walls of the tank, thereby preventing abnormal lateral swinging movements of the tube.

3. In a fuel tank as set forth in claim 1, said float being pivotally connected with the tube adjacent its free end.

4. In a fuel tank as set forth in claim 1, said flexible member being connected to the tube adjacent its free end, and having a portion extending through a guide on the float.

JAMES STANLEY JOHNSON.